Dec. 11, 1928.
C. HORIX
1,694,944
EXPANSION BELT
Filed July 10, 1926
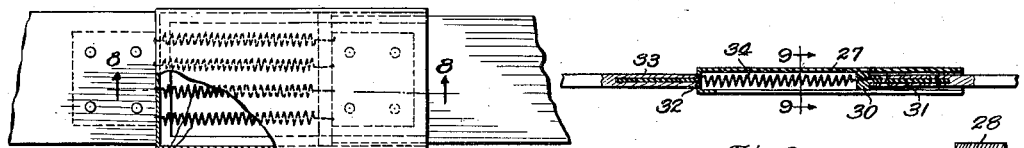
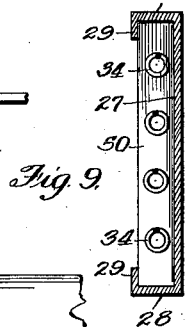
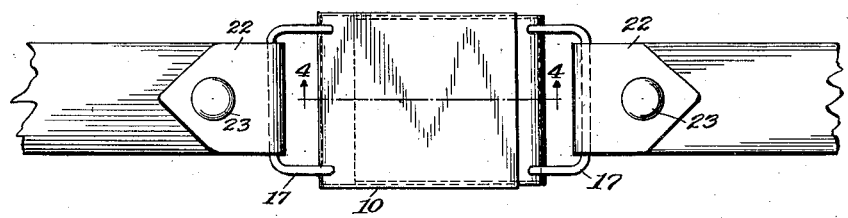
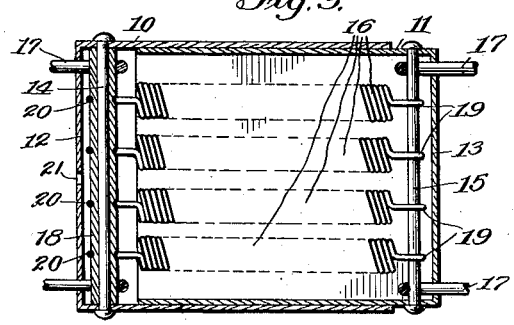
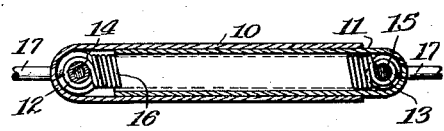
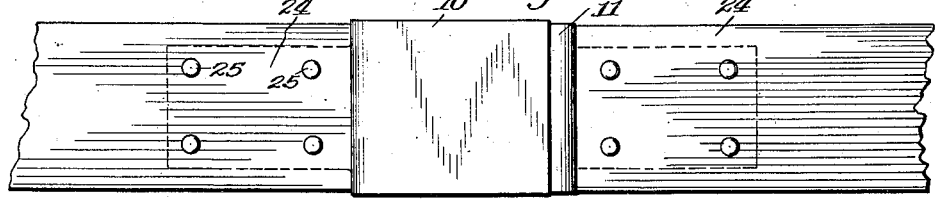
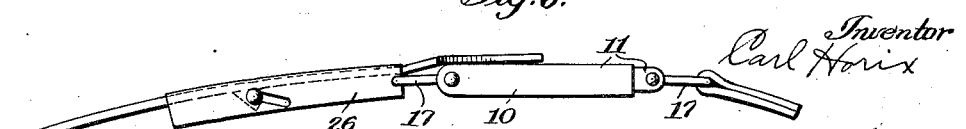

Patented Dec. 11, 1928.

1,694,944

UNITED STATES PATENT OFFICE.

CARL HORIX, OF CHICAGO, ILLINOIS.

EXPANSION BELT.

Application filed July 10, 1926. Serial No. 121,631.

The object of the invention is to provide a belt which shall permit expansion to give free movement to the wearer and one in which the expansion is provided by metallic springs or other suitable yielding members which are carried by a frame or casing attached between portions of the belt.

Other objects will appear from the following description.

The invention is exemplified in the combination and arrangement of parts shown in the accompanying drawing and described in the following specification, and it is more particularly pointed out in the appended claim.

In the drawing—

Fig. 1 is an edge view of a portion of a belt showing one embodiment of the present invention applied thereto;

Fig. 2 is a side view of the parts shown in Fig. 1;

Fig. 3 is a section on line 3—3 of Fig. 1;

Fig. 4 is a section on line 4—4 of Fig. 2;

Fig. 5 is a view similar to Fig. 2, showing a different manner of connecting the expansion member between belt sections;

Fig. 6 is an edge view of a portion of a belt showing the expansion member attached to a belt buckle;

Fig. 7 is a view similar to Fig. 2, with parts broken away showing a somewhat modified form of the invention;

Fig. 8 is a section on line 8—8 of Fig. 7; and

Fig. 9 is a section on line 9—9 of Fig. 8.

It is well known that for many people an inelastic belt which is buckled sufficiently tightly to support the trousers must be too tight for comfort and for this reason belts of elastic material have been suggested, but material of this nature is not sufficiently durable to be of long practical service. The present invention provides an elastic element which may be introduced into belts or leather or other strong material and which will be practically indestructible by ordinary wear.

One form of the invention is illustrated in Figs. 1 to 4, inclusive, in which a pair of sheet metal housing members 10 and 11 are arranged to telescope one within the other. The telescoping end of the housing members are open, as shown in Fig. 3, and the outer ends may be provided with end walls 12 and 13. It will be understood that these end walls are provided merely to close the ends of the casing and are not essential to the operation of the device, although they add to the appearance. Pins 14 and 15 extend through the housing members 10 and 11 adjacent the outer ends thereof and are connected by coil springs 16 which are thus placed in tension when force is exerted on the housing members tending to draw them outwardly. Wire loops 17 extend through slots in the ends 12 and 13 and are looped about the pins 14 and 15, as shown in Figs. 3 and 4. One of the pins 14 may be provided with a sleeve 18 to facilitate assembling of the parts.

In assembling the parts, the springs 16 are inserted into the housing member 11 and the pin 15 is then threaded through the loops 17 and through the eyes 19 formed at the ends of the springs 16. One end of the pin 15 is headed after it has been passed through the eyes 19 and the openings in the edges of the housing member 11. The eyes 20 at the opposite ends of the springs 16 are then placed in grooves in the sleeve 18. A wire or string may be looped about the sleeve 18 and passed through an opening 21 in the end 12 and the sleeve drawn to the end of the housing 10 to bring the opening therethrough into registration with the openings in the edges of the housing member 10. It will be understood that without the sleeve 18 it would be difficult to bring the eyes 20 into proper angular position and into alinement for receiving the pin 14 after the eyes 19 have been secured in place on the pin 15. By using a sleeve and providing a flexible member passed through the opening 21 for drawing the sleeve into place, the parts may be readily assembled.

The slots in the casing member 10 for receiving the ends of the loops 17 may be made of sufficient length to permit the ends of the loops to be bent about the sleeve 18 after the sleeve is in place in the casing 10. The expansion member may be inserted in the belt at any convenient position. If placed at the back it will be inconspicuous and out of the way. The connected ends of the belt may be provided with flaps 22 which are passed through the loops 17 and secured in place by means of snap fasteners 23. Any other suitable means may be employed for securing the expansion element in the belt, but the snap fasteners permit easy removal of the expansion element and transfer from one belt to another. Instead of securing the ends of the belt to loops, as shown in Fig. 1, the telescoping sections 10 and 11 may be provided with projecting plates 24 to which the ends of the belt are secured by rivets or other securing devices 25. It will be apparent that one of the links 17 may be secured to a belt buckle 26, as shown in Fig. 6 of the drawing, while the opposite link 17 is secured to the end of the belt. This will bring the expansion member in front and adjacent the belt buckle.

A somewhat simplified construction is shown in Figs. 7, 8, and 9. In this construction a plate 27 has its edges bent over to form edge walls 28, the edges of the walls 28 being bent inwardly to form guide flanges 29. A bar 30 is slidably mounted between the flanges 29 and the plate 27 and is provided with a web or plate 31 to which the end of the belt is secured. One end of the plate 27 is bent inwardly to form an end wall 32 having a web 33 to which the opposite end of the belt is secured. The end wall 32 and the bar 30 are connected by coil springs 34 which have their ends secured to said end wall and bar, respectively, in any suitable manner. In this construction it will be seen that the belt extends into the housing formed by the plate 27 so that there is no relative movement of the metal parts visible on the outer side of the belt. It will be understood that the housing shown in Figs. 7 and 8 may be provided with a solid back plate as well as a front plate, if desired, and also that the side walls of the telescoping members shown in Figs. 1, 2, and 3 may be made of open-work instead of solid metal plates, if desired.

I claim:—

In combination, a pair of telescoping housing members having their inner ends open, pins extending through said housing members respectively, coil springs having their ends connected to said pins, one of said pins have a sleeve thereon for facilitating assembly of said housing members, springs and pins, and means for attaching the outer ends of said housing members to adjacent ends of connected belt sections.

In testimony whereof I have signed my name to this specification on this 6th day of July, A. D. 1926.

CARL HORIX.